United States Patent
Alfieri

(10) Patent No.: US 7,437,548 B1
(45) Date of Patent: Oct. 14, 2008

(54) NETWORK LEVEL PROTOCOL NEGOTIATION AND OPERATION

(75) Inventor: Robert A. Alfieri, Chapel Hill, NC (US)

(73) Assignee: NVIDIA Corporation, Santa Clara, CA (US)

( * ) Notice: Subject to any disclaimer, the term of this patent is extended or adjusted under 35 U.S.C. 154(b) by 615 days.

(21) Appl. No.: 10/253,362

(22) Filed: Sep. 23, 2002

Related U.S. Application Data

(60) Provisional application No. 60/395,527, filed on Jul. 11, 2002.

(51) Int. Cl.
H04L 9/00 (2006.01)

(52) U.S. Cl. .................................... 713/150
(58) Field of Classification Search ............. 713/150; 726/14, 2
See application file for complete search history.

(56) References Cited

U.S. PATENT DOCUMENTS

| | | | |
|---|---|---|---|
| 5,742,773 A * | 4/1998 | Blomfield-Brown et al. | 709/228 |
| 5,826,027 A * | 10/1998 | Pedersen et al. | 709/221 |
| 5,884,025 A | 3/1999 | Baehr et al. | |
| 6,032,253 A * | 2/2000 | Cashman et al. | 712/300 |
| 6,047,325 A | 4/2000 | Jain et al. | |
| 6,055,236 A | 4/2000 | Nessett et al. | |
| 6,094,485 A * | 7/2000 | Weinstein et al. | 380/30 |
| 6,101,170 A | 8/2000 | Doherty et al. | |
| 6,141,705 A | 10/2000 | Anand et al. | |
| 6,189,102 B1 | 2/2001 | Beser | |
| 6,215,907 B1 | 4/2001 | Kumar et al. | |
| 6,304,573 B1 | 10/2001 | Hicks, III | |
| 6,327,660 B1 * | 12/2001 | Patel | 713/193 |
| 6,389,419 B1 | 5/2002 | Wong et al. | |
| 6,449,647 B1 | 9/2002 | Colby et al. | |
| 6,496,867 B1 | 12/2002 | Beser et al. | |
| 6,542,935 B1 | 4/2003 | Ishii | |
| 6,542,992 B1 * | 4/2003 | Peirce et al. | 713/153 |
| 6,615,357 B1 | 9/2003 | Boden et al. | |
| 6,629,150 B1 | 9/2003 | Huded | |
| 6,646,999 B1 | 11/2003 | Kato et al. | |

(Continued)

FOREIGN PATENT DOCUMENTS

EP 1130846 9/2001

(Continued)

OTHER PUBLICATIONS

"Ciscopress.com IPSec Overview Part Four: Internet Key Exchange (IKE)", Andrew Mason, Feb. 22, 2002.

(Continued)

Primary Examiner—Emmanuel L Moise
Assistant Examiner—Ali S Abyaneh
(74) Attorney, Agent, or Firm—Patterson & Sheridan, LLP

(57) ABSTRACT

Method and apparatus for network level protocol negotiation for Internet Protocol Security (IPSec) and Internet Protocol Payload Compression (IPComp) are described. More particularly, IPSec and IPComp capabilities are instantiated in a network processor unit of a network interface in at least two communicating computers. By determining each computer has the capacity to due IPSec and IPComp at the transport level, such is negotiated and executed at the transport level independently of an operating system and a central processing unit usage. Additionally, encryption and/or compression are done at the network level operating system and central processing unit offloading.

16 Claims, 4 Drawing Sheets

U.S. PATENT DOCUMENTS

| | | | |
|---|---|---|---|
| 6,647,428 B1 | 11/2003 | Bannai et al. | |
| 6,658,463 B1 | 12/2003 | Dillon et al. | |
| 6,704,794 B1 | 3/2004 | Kejriwal et al. | |
| 6,714,985 B1 | 3/2004 | Malagrino et al. | |
| 6,735,647 B2 | 5/2004 | Boyd et al. | |
| 6,757,746 B2 | 6/2004 | Boucher et al. | |
| 6,781,955 B2 | 8/2004 | Leung | |
| 6,832,261 B1 | 12/2004 | Westbrook et al. | |
| 6,879,266 B1 | 4/2005 | Dye et al. | |
| 6,888,835 B2 | 5/2005 | Reeve | |
| 6,889,385 B1 | 5/2005 | Rakib et al. | |
| 6,904,519 B2 | 6/2005 | Anand et al. | |
| 6,907,042 B1 | 6/2005 | Oguchi | |
| 6,909,714 B2 | 6/2005 | Abrol et al. | |
| 6,912,522 B2 * | 6/2005 | Edgar | 707/2 |
| 6,950,862 B1 * | 9/2005 | Puthiyandyil et al. | 709/220 |
| 6,957,346 B1 | 10/2005 | Kivinen et al. | |
| 7,010,727 B1 * | 3/2006 | Stucker | 714/52 |
| 7,017,175 B2 * | 3/2006 | Alao et al. | 725/105 |
| 7,027,443 B2 | 4/2006 | Nichols et al. | |
| 7,116,640 B2 | 10/2006 | Tasman et al. | |
| 7,136,926 B1 | 11/2006 | Iyer et al. | |
| 2001/0032254 A1 | 10/2001 | Hawkins | |
| 2001/0038642 A1 | 11/2001 | Alvarez et al. | |
| 2001/0054131 A1 | 12/2001 | Alvarez et al. | |
| 2002/0009083 A1 | 1/2002 | Ambe et al. | |
| 2002/0009136 A1 | 1/2002 | Heath | |
| 2002/0046348 A1 | 4/2002 | Brustoloni | |
| 2002/0078242 A1 | 6/2002 | Viswanath | |
| 2002/0083344 A1 | 6/2002 | Vairavan | |
| 2002/0089979 A1 | 7/2002 | Abdulkader | |
| 2002/0133534 A1 | 9/2002 | Forslow et al. | |
| 2002/0133598 A1 | 9/2002 | Strahm et al. | |
| 2002/0136210 A1 | 9/2002 | Boden et al. | |
| 2002/0138848 A1 | 9/2002 | Alao et al. | |
| 2002/0162026 A1 | 10/2002 | Neuman et al. | |
| 2002/0169885 A1 | 11/2002 | Alao et al. | |
| 2002/0172164 A1 | 11/2002 | Chou et al. | |
| 2003/0007486 A1 | 1/2003 | March et al. | |
| 2003/0012190 A1 | 1/2003 | Kaku et al. | |
| 2003/0028606 A1 | 2/2003 | Koopmans et al. | |
| 2003/0110296 A1 | 6/2003 | Kirsch et al. | |
| 2003/0142823 A1 * | 7/2003 | Swander et al. | 380/277 |
| 2003/0145226 A1 | 7/2003 | Bruton, III et al. | |
| 2003/0146907 A1 | 8/2003 | Boals et al. | |
| 2003/0154399 A1 | 8/2003 | Zuk et al. | |
| 2003/0179713 A1 | 9/2003 | Fleming | |
| 2003/0197719 A1 | 10/2003 | Lincke et al. | |
| 2003/0233568 A1 | 12/2003 | Maufer et al. | |
| 2003/0233576 A1 | 12/2003 | Maufer et al. | |
| 2004/0030927 A1 | 2/2004 | Zuk | |
| 2004/0114589 A1 | 6/2004 | Alfieri et al. | |
| 2005/0182854 A1 | 8/2005 | Pinkerton et al. | |
| 2005/0281288 A1 | 12/2005 | Banerjee et al. | |

FOREIGN PATENT DOCUMENTS

| | | |
|---|---|---|
| WO | WO 99/35799 | 7/1999 |
| WO | WO 00/56034 | 9/2000 |
| WO | WO 01/67258 | 9/2001 |
| WO | WO 01/76191 | 10/2001 |

OTHER PUBLICATIONS

"RE: IPCOMP and IPSEC", Robert Moskowitz, Jun. 4, 1998.
"Diffie-Hellman key exchange", Wikipedia, 2002.
"PKCS #3: Diffie-Hellman Key Agreement Standard", RSA Laboratories Technical Note, Nov. 1, 1993.
"Ciscopress.com IPSec Overview Part Four: Internet Key Exchange (IKE)", Andrew Mason, Feb. 22, 2002.
"RE: IPCOMP and IPSEC", Robert Moskowitz, Jun. 4, 1998.
"Diffie-Hellman key exchange", Wikipedia, 2002.
"PKCS #3: Diffie-Hellman Key Agreement Standard", RSA Laboratories Technical Note, Nov. 1, 1993.
"Path MTU Discovery", Mogul et al., RFC 1191, Nov. 1990.
Internet Protocol, RFC 791, Darpa, Sep. 1981.
Orda et al. "Optimal Packet Fragmentation in Computer Networks", Mar. 1994.

* cited by examiner

NETWORK LEVEL PROTOCOL NEGOTIATION AND OPERATION

CROSS-REFERENCE TO RELATED APPLICATIONS

This application claims priority to a provisional application Ser. No. 60/395,527, filed on Jul. 11, 2002, entitled Network Level Protocol Negotiation and Operation, invented by Robert A. Alfieri, and incorporated herein by reference.

FIELD OF THE INVENTION

The present invention relates generally to network protocol negotiation, and more particularly to Internet Protocol Security (IPSec) and Internet Protocol Payload Compression (IPComp) without need for Operating System (OS) intervention.

BACKGROUND OF THE INVENTION

The Internet remains a growing public network. Many companies rely on communication over the Internet using Internet Protocol (IP) to facilitate their business endeavors. However, public access also comes along with security risks. To address enhancement of security on the Internet, the Internet Engineering Task Force (IETF) proposed Internet Protocol Security (IPSec). IPSec is designed to provide authentication and encryption for communication over insecure networks, such as the Internet.

Another issue facing business over the Internet is once a packet is encrypted it cannot easily be compressed. This is because once encrypted there are conventionally no recognizable patterns upon which to seize for a compression algorithm. At one time, modem-based per-packet compression was common. Thus, IPSec encryption would render modem-based compression useless. Accordingly, to address throughput for encrypted traffic, the IETF proposed Internet Protocol Payload Compression (IPComp). IPComp is for systems to agree upon a type of compression for exchanging information. An advantage to compression before encryption is that IPSec and IPComp add overhead, for example additional headers, which may cause a packet to be too large to avoid fragmentation. However, if such a packet may be sufficiently compressed, then fragmentation, even with addition of such overhead, may be avoided.

It should be understood that IPSec adds overhead in part due to a complex negotiation protocol named Internet Key Exchange (IKE). Furthermore, both IPSec and IPComp, individually and collectively, significantly consume computer system resources, thereby hampering performance. More particularly, IPSec and IPComp each conventionally require demanding computations, and accordingly, it would be desirable to offload IPComp or IPSec or both to a lower layer entity that does not consume host central processing unit (CPU) time.

Accordingly, it would be desirable and useful to provide negotiation for and execution of IPSec or IPComp or both at a level that consumes less CPU time. Moreover, it would be desirable and useful if such negotiation was transparent to or otherwise independent of an Operating System (OS).

SUMMARY OF THE INVENTION

An aspect of the present invention is a method of compression and security enhancement independently of operating system and central processing unit usage. More particularly, a first computer is provided having a first network processor. A second computer is provided having a second network processor. A first message is sent from the first computer to the second computer indicating existence of the first network processor having at least one of security and compression protocol capabilities. A second message is sent from the second computer to the first computer in response to the first message. The second message indicates existence of the second network processor having at least one of the security and compression protocol capabilities. If agreement is reached, then encryption and/or compression negotiation is done at the network level. Additionally, encrypting and/or compressing are done at the network level for network processors having one or more of such capabilities.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the present invention may admit to other equally effective embodiments.

DETAILED DESCRIPTION OF THE DRAWINGS

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1:
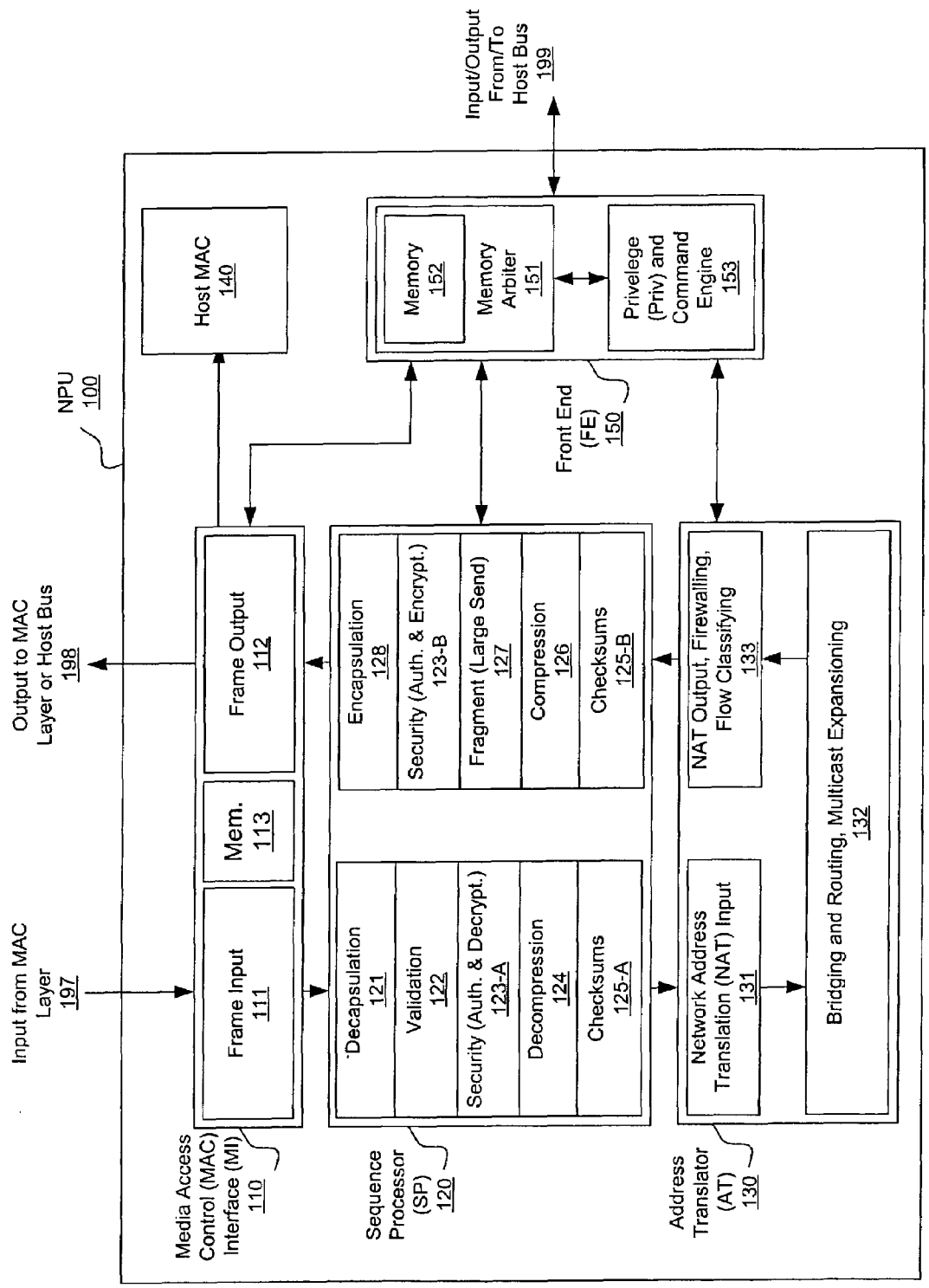
FIG. 1 is a block diagram of an exemplary embodiment of a network processor unit (NPU) in accordance with one or more aspects of the present invention.

Referring to FIG. 1, there is shown a block diagram of an exemplary embodiment of a network processor unit (NPU) 100 in accordance with one or more aspects of the present invention. NPU 100 comprises media access controller (MAC) interface (MI) 110, sequence processor 120, address translator 130, host MAC 140, and front end 150. NPU 100 micro architecture uses a hardwired pipeline without a central processing unit (CPU) core. A network driver program and NPU 100 communicate with one another using commands via push buffers (PBs), namely, a command buffer going from software to NPU or NPU to software.

Input from MAC layer 197 and output to MAC layer or host bus 198 may be in a form compatible with one or more of Ethernet 10/100/1000 mega-bits-per-second (Mbps) (IEEE 802.3) for local area network (LAN) connectivity, Home Phoneline Network Alliance (HomePNA or HPNA), wireless local area network (WLAN) (IEEE 802.11), and a digital signal processor (DSP) MAC layer, among others. Though a personal computer workstation embodiment is described herein, it should be understood that NPU 100 may be used in other known devices for network connectivity, including, but not limited to, routers, switches, gateways, and the like. Furthermore, a host or local bus may be a Fast Peripheral Component Interconnect (FPCI) bus; however, other buses, whether directly accessed or coupled to a host bus, include, but are not limited to, Peripheral Component Interconnect (PCI), 3GIO, Video Electronic Standards Association (VESA), VersaModule Eurocard (VME), Vestigial Side Band (VSB), Accelerated Graphics Port (AGP), Intelligent I/O (I2O), Small Computer System Interface (SCSI), Fiber Channel, Universal Serial Bus (USB), IEEE 1394 (sometimes referred to as "Firewire," "iLink" and "Lynx"), Personal Computer Memory Card International Association (PCM-CIA), and the like.

NPU 100 receives a frame input from MAC layer 197. This frame flows through NPU 100's routing pipeline, starting with MAC interface 110. MAC interface 110 receives one or more frame inputs 111. MAC interface 110 is coupled to front end (FE) 150 for access to memory 152 via memory arbiter 151. Frame inputs 111 are processed in part by placing them into staging buffers in cache memory 113. If capacity of staging buffers is exceeded or downstream NPU 100 pipeline is blocked, spill over frames are queued in memory 152. Frame inputs 111 have a respective canonical frame header (CFH) added to the beginning of a frame to indicate its type and input MAC index. Notably, handling of frame inputs 111 can depend at least in part on frame type. For example, WLAN management frames and other unrouted frames have their CFH marked for routing directly to Host MAC 140, while other frames are passed to sequence processor 120.

For purposes of clarity of explanation, processing of one frame through NPU 100 pipeline will be described, though it should be understood that multiple frames may be pipeline-processed through NPU 100. Frame input 111 is provided to sequence processor 120. Sequence processor 120 decapsulates frame input 111 at decapsulation step 121. This decapsulation may be conventional with respect to Point-to-Point Protocol (PPP) processing. At step 122, IP header validation is performed in a conventional manner. At step 123-A authentication and decryption are done. This may be done in accordance with IPSec with MD5 and SHA-1 authentication standards each of which is part of IPSec. Types of authentication that may be done include, but are not limited to, MD5 and SHA, among other types of hashing. For example, TKIP Michael and AES-OCB authentication may be used along with IPComp. Types of encryption that may be done include, but are not limited to, AES, DES, 3DES and RC4, among other types of key encryption. For example, IEEE 802.11 encryption such as WEP, TKIP and AES-OCB may be used. At step 124, payload associated with a message of frame input 111 is decompressed. Types of decompression that may be done include, but are not limited to, MPPC and LZS, among other types of compression. Notably, authentication, decryption/encryption and decompression/compression algorithms may be accessed by sequence processor 120 from lookup tables in memory 152.

At step 125-A, checksum or other conventional error detection may be done. Notably, a message may not be part of a secure communication, in which case no authentication and decryption is done. Moreover, a message may not be compressed, in which case no decompression is done. However, assuming a frame has been decapsulated, validated, authenticated, decrypted, decompressed, and error checked such that it passes, messages or packets obtained are sent to address translator (AT) 130. For purposes of clarity of explanation, processing of a single packet is described below, though it should be understood that multiple packets may be processed.

Address translator 130 provides conventional Network Address Translation (NAT) for converting public IP addresses to private IP addresses. However, if a packet is from a LAN, then conventionally no address translation is done. Rather, NAT is done at step 131 for a packet communicated over a wide area network (WAN), including, but not limited to, a portion of the Internet. If IPSec is used with NAT, address translation may be done as describe in a copending U.S. patent application entitled "METHOD AND APPARATUS FOR SECURITY PROTOCOL AND ADDRESS TRANSLATION INTEGRATION" by Thomas A. Maufer, Sameer Nanda, and Paul J. Sidenblad, filed Jun. 13, 2002, application Ser. No. 10/172,352, which is incorporated by reference as though fully set forth herein.

At step 132, bridging and routing, as well as multicast expansioning as applicable, are done. A routing table lookup from memory 152 is done for an Address Resolution Protocol (ARP) to convert an IP address for a packet into a physical address. Moreover, if more than one output MAC address is specified, then multicast expansioning is done. Notably, at this point a packet may be output for use by a host computer user.

Routing from address translator 130 for a packet may be for sending such a packet. Accordingly, sending of packets using NPU 100 is described. At step 132, a routing table lookup from memory 152 is done to get an output MAC address for output 198. Moreover, if more than one output MAC address is specified, then multicast expansioning is done. At step 133, output NAT is done in a conventional manner, unless IPSec is being used with NAT. If IPSec is being used with NAT, then address translation may be done as describe in copending U.S. patent application entitled "METHOD AND APPARATUS FOR SECURITY PROTOCOL AND ADDRESS TRANSLATION INTEGRATION" by Thomas A. Maufer, Sameer Nanda, and Paul J. Sidenblad, filed Jun. 13, 2002, application Ser. No. 10/172,352, which is incorporated by reference as though fully set forth herein.

In addition to NAT, conventional firewalling may be done at step 133. Furthermore, at step 133, flow classification is done, namely, review header fields, classify packets in lookup tables in cache memory, mark CFH with per-MAC output first-in first-out (FIFO) index, new priority and a new ToS. At step 125-B, checksum or other error checking is done, similar to that done at step 125-A. At step 126, compression may be done by sequence processor 120. If compression is not successfully negotiated, then compression is not done. At step 127, fragmentation may be done, namely, fragmenting IP packets based on an MTU of an output MAC. Embodiments of fragmentation are described below in more detail. At step 123-B, if security, such as IPSec, has been successfully negotiated, then authentication and encryption are done to a packet, as is known. Notably, authentication, decryption/encryption and decompression/compression algorithms may be accessed by sequence processor 120 from lookup tables in memory 152. At step 128, PPP encapsulation is done.

One or more error checked, compressed, fragmented, authenticated, encrypted and encapsulated packets are provided as a frame from sequence processor 120 to MAC interface 110 as frame output 112. MAC interface 110 writes a frame from sequence processor 120 to one or more staging buffers in cache memory 113. If MAC interface 110 does not have priority to do such writing to cache memory 113 due to flow scheduling, such frame is spilled over to memory 152. Frame output 112, once scheduled, is output-to-output MAC layer or host bus 198.

NPU 100 may form a portion of an intelligent network interface (sometimes referred to as a "network interface card" or "NIC"), and thus NPU 100 may be used to do computationally intensive network stack operations rather than using a host central processing unit (CPU). This frees up the CPU for other activities.

Figure 2:
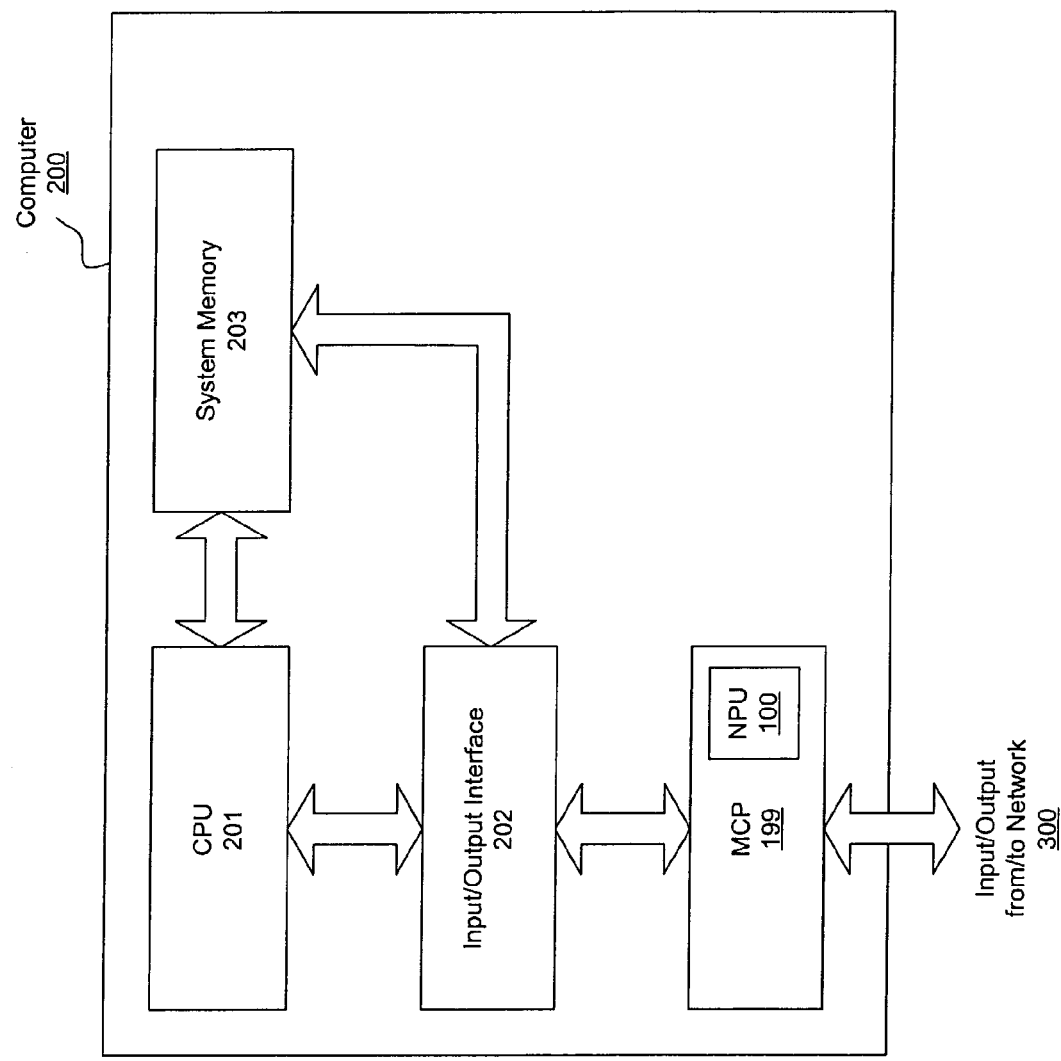
FIG. 2 is a block diagram of an exemplary embodiment of a computer system in accordance with one or more aspects of the present invention.

Referring to FIG. 2, there is shown a block diagram of an exemplary embodiment of a computer system 200 in accordance with one or more aspects of the present invention. Computer system 200 comprises CPU 201, system memory 203, input/output (I/O) interface 202, and media communications processor (MCP) 199, all of which are coupled via a plurality of buses 204. MCP 199 comprises NPU 100. MCP 199 may be coupled for I/O from/to a network 300.

Figure 3:
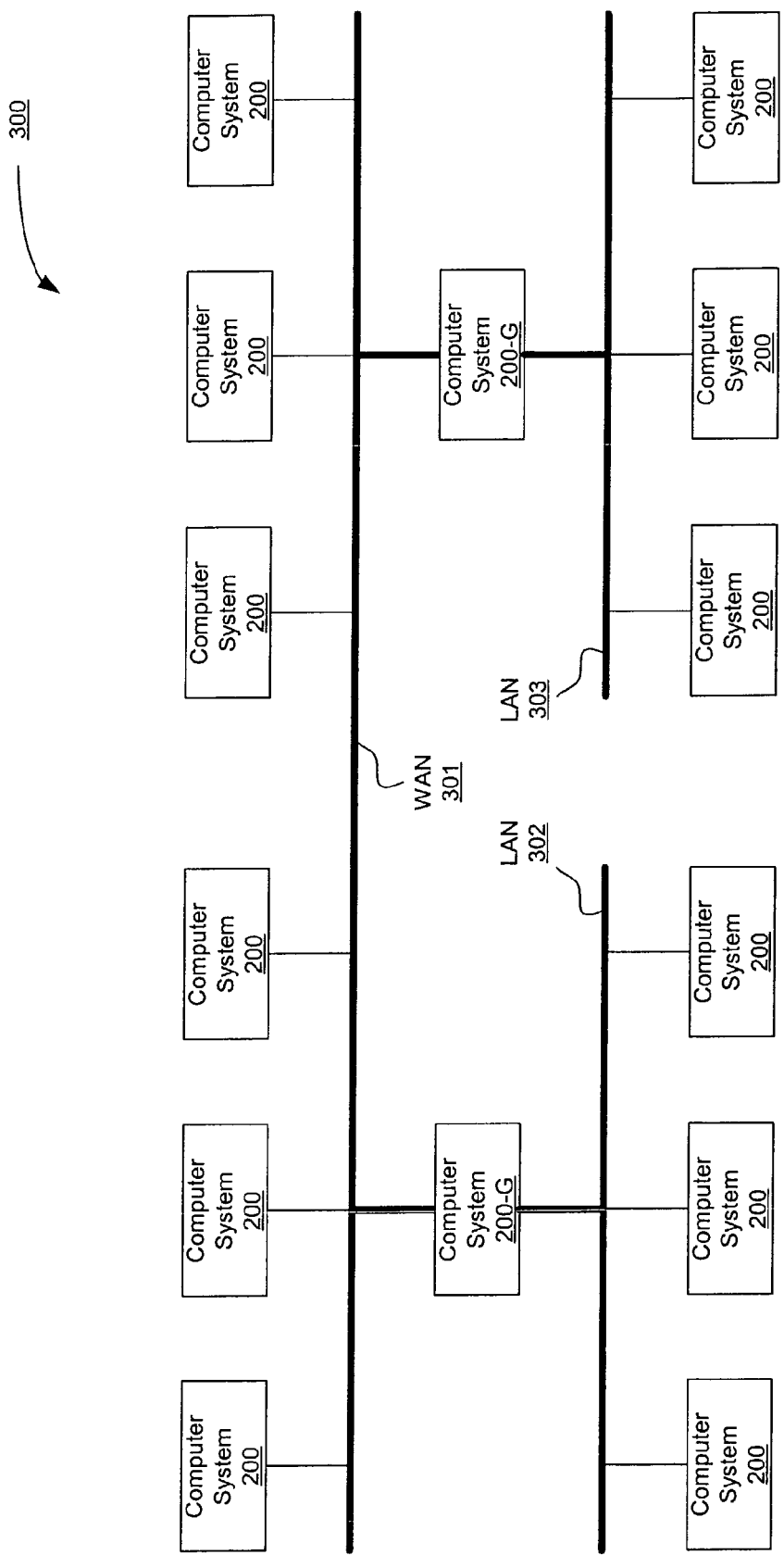
FIG. 3 is a block diagram of an exemplary embodiment of a network in accordance with one or more aspects of the present invention.

Referring to FIG. 3, there is shown a block diagram of an exemplary embodiment of a network 300 in accordance with one or more aspects of the present invention. Network 300 comprises computer systems 200 coupled to one another via WAN 301 and LANs 302 and 303. Notably, computer systems 200-G serve as gateways for LANs 302 and 303. However, computer systems 200 may be in direct communication with one another, such as over the Internet. Because two or more computer systems 200 have NPU 100, they may send packets back and forth to acknowledge such configuration, as described in more detail with reference to FIG. 4.

Figure 4:
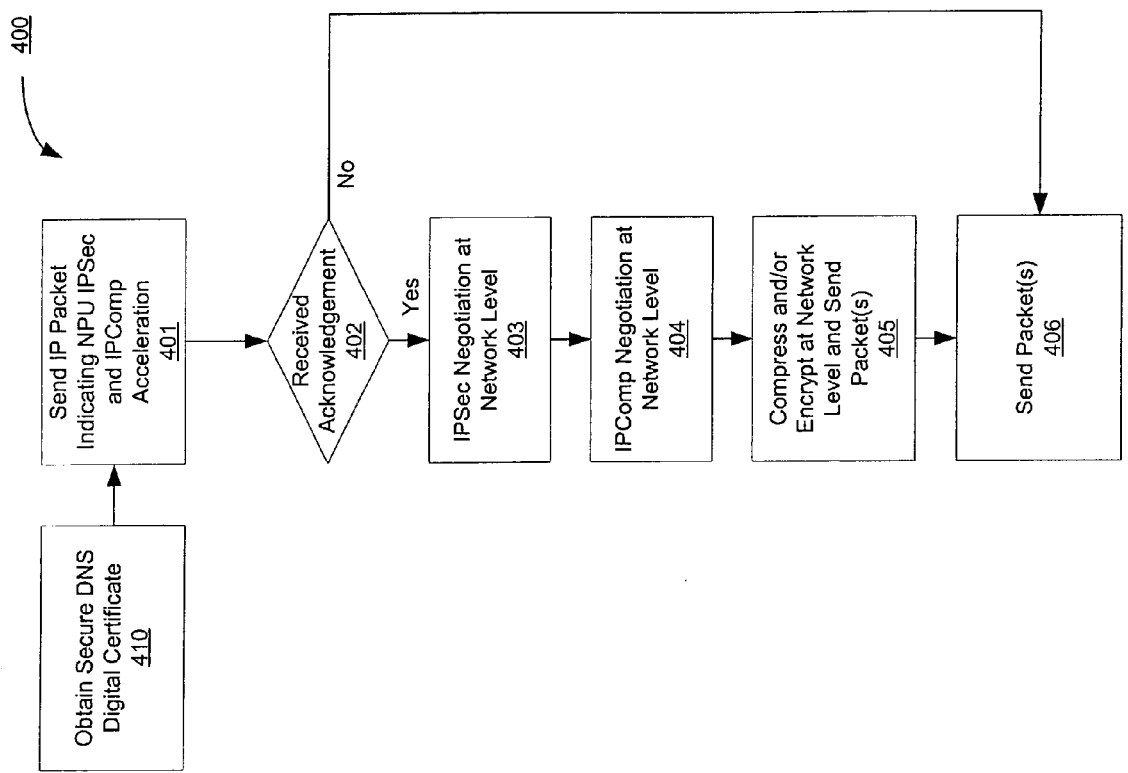
FIG. 4 is a process flow diagram for an exemplary embodiment of a communication process between two computer systems each having an NPU in accordance with one or more aspects of the present invention.

In FIG. 4, there is shown a process flow diagram for an exemplary embodiment of a communication process 400 between two computer systems 200 each having an NPU 100 in accordance with one or more aspects of the present invention. Though communication process 400 is described in terms of just two computers, it should be appreciated that communication process 400 is extendable to more than two computers.

In response to a request to send a message from a computer system 200 to another computer system 200, an IP Packet may be sent from NPU 100 of a sending computer without OS prompting. This is indicated at step 401, where prior to sending one or more user messages, a sending computer optionally sends an IP packet to a receiving computer. This IP packet indicates to a receiving computer, or more particularly receiving NPU 100, that the sending computer, or more particularly sending NPU 100, is capable of accelerating IPSec and/or IPComp. In other words, sending NPU 100 has ability to handle IPSec and/or IPComp negotiation at a network level, as well as encrypting and/or compressing at a network level.

Presumably, a digital certificate has already been obtained for an IKE negotiation for IPSec. Alternatively, a secure DNS (Domain Name System) may be used to obtain a digital certificate at step 410 for opportunistic encryption.

At step 402, it is determined if a receiving NPU 100 sent an acknowledgement IP packet indicating capacity to accelerate IPSec and/or IPComp, which acknowledgement IP packet may be similar to an inquiry IP packet sent by the sending NPU 100. If no acknowledgement IP packet is received at step 402 within a predefined time, then data communication proceeds conventionally at step 406. If, however, an acknowledgement IP packet is received at step 402, then at step 403 IPSec negotiation proceeds. Accordingly, it should be appreciated that general physical topology of a receiving computer system is not being determined; rather, what is being determined is that a particular device, namely, an NPU, exists having an ability to accelerate IPSec and/or IPComp.

In contrast and alternatively, communication process 400 may begin at step 403 with an attempt, which may or may not be successful, to do an IPSec negotiation. If another NPU 100 is present on a receiving end of an initiated IPSec negotiation or such other computer has other IPSec capability, such as may be embodied in software, then IPSec may be accelerated with respect to a sending computer by negotiating IPSec and encrypting at a network level.

At step 404, IPComp negotiation is done to see if an agreement upon a compression algorithm, including, but not limited to, LZS, DEFLATE, ITU-T, and MPPC, may be made. Once IPSec and IPComp have been negotiated, packet payload is compressed, if IPComp agreement was reached, at step 405. Additionally, if IPSec negotiation was successful, packet information is encrypted in accordance with Authentication Header and/or Encapsulated Security Payload IPSec at step 405. Advantageously, IPSec and/or IPComp negotiation is offloaded to NPU 100. Moreover, compression and/or encryption are also offloaded to NPU 100. Thus, communication between two or more computers, such as for multicasting, may be done with compressed and encrypted payload independently of an operating system and independently of a computer's system level processor.

Notably, IP traffic between a sending NPU and a receiving NPU is transparently encapsulated in IPSec and IPComp. These auto-negotiated IPSec and IPComp transformations on IP packets occur transparently to applications and to an operating system. In another embodiment, IPSec and IPComp are auto-negotiated before an operating system is booted. This allows standalone applications, including, but not limited to, web browsers, to operate without the presence of a conventional operating system. Moreover, because IPSec and IPComp occur at a low level, namely, the network level, CPU time is not consumed enhancing system performance for IPSec and IPComp activity.

Notably, by using compression, fewer packets may be used to send a data to reduce bandwidth consumption. Moreover, as NPU 100 does encryption and compression, CPU time is not consumed for it.

By combining IPSec and IPComp acceleration into an integrated NPU in accordance with one or more aspects of the present invention, IPSec and IPComp may be run transparently with respect to a user, as well as an operating system. This is because auto-negotiation between two host computers with respective NPUs occurs below an operating system layer, as well as encryption and compression after such negotiation. This is particularly useful in wireless LAN (WLAN) applications for reasons of enhance security and bandwidth limitations. Moreover, auto-negotiation may occur without booting an operating system, rendering IPSec and IPComp available for portable code, such as JAVA Applets and the like.

While foregoing is directed to the preferred embodiment of the present invention, other and further embodiments of the invention may be devised without departing from the basic scope thereof, and the scope thereof is determined by the claims that follow. All trademarks are the respective property of their owners.

The invention claimed is:

1. A method of negotiating security and compression of packets independently from an operating system, the packets being transmitted between a first computer having a first CPU running a first operating system and a first network processor and a second computer having a second CPU running a second operating system and a second network processor, the method comprising:

sending a first message over a network from the first network processor directly to the second network processor indicating existence of the first network processor having security protocol and compression protocol capability without prompting from the first operating system; and sending a second message from the second network processor directly to the first network processor in response to the first message, the second message acknowledging existence in the second network processor of security protocol capability and compression protocol capability; and the first network processor responding to receipt of the second message by directly sending packets which are compressed and encrypted over the network to the second network processor.

2. The method of claim 1 further comprising:

negotiating security information independently from the operating system;

negotiating compression information independently from the operating system; and sending the packets which are first compressed and then encrypted from the first computer to the second computer.

3. The method of claim 2 wherein the step of negotiating security information is Internet Protocol Security, and wherein the step of negotiating compression information is Internet Protocol Payload Compression.

4. A method as claimed in claim 1 wherein data transmission of the packets from the first computer to the second computer proceeds without compression and encryption if the acknowledgement is not received within a predefined time.

5. The method of claim 1 comprising:

sending the packets which are first compressed and then encrypted from the first computer to the second computer.

6. A method of compression and security enhancement for communication between a first computer having a first network processor and a first central processing unit (CPU) that runs a first operating system, the first network processor embedded in a first media communications processor, and a second computer having a second network processor and a second CPU that runs a second operating system, the second network processor embedded in a second media communications processor, without intervention by the first and second operating systems, comprising:

sending a first message from the first network processor directly to the second network processor indicating existence of the first network processor having a sequence processor capable of a security protocol and a compression protocols without intervention from the first operating system; and sending a second message from the second network processor directly to the first network processor in response to the first message, the second message indicating existence of the second network processor having a sequence processor capable of supporting the security protocol and the compression protocol without intervention from the second operating system.

7. The method of claim 6 further comprising:

negotiating at least one of the security protocol and compression protocol information; and sending packets in at least an encrypted form and a compressed form from the first computer to the second computer utilizing the negotiated protocols.

8. The method of claim 7 wherein the step of negotiating security information is Internet Protocol Security, and wherein the step of negotiating compression information is Internet Protocol Payload Compression.

9. The method of claim 8 wherein the step of sending packets comprises at least one of encrypting and compressing data in the packets with the first network processor.

10. The method of claim 9 wherein the step of sending packets comprises multicasting the packets.

11. The method of claim 7 wherein the packets comprise payload that is compressed but not encrypted.

12. The method of claim 7 wherein the packets comprise payload that is encrypted but not compressed.

13. The method of claim 7 wherein the packets comprise payload that is encrypted and compressed.

14. An integrated network processing unit (NPU) included in a host computer having a CPU running an operating system, the NPU configured to transmit packets over a network using internet protocol payload compression followed by internet protocol security without intervention by the operating system, comprising:

a sequence processor configured for pipeline processing of frames of data, the sequence processor including:

compression unit for compressing a frame data, encryption unit for encrypting the compressed frame of data, interface unit configured to send an IP Packet from the transmitting NPU without any prompting from the operating system directly to a receiving NPU, the IP Packet indicating to the receiving computer that the transmitting NPU is capable of sending compressed and encrypted packets, the transmitting NPU being configured to respond to an acknowledgement sent directly from the receiving NPU that the receiving computer supports compression and encryption by activating the sequence processor to send one or more data frames which are compressed and then encrypted, and wherein the sequence processor provides algorithms for controlling the compression unit and the encryption unit with respect to the packets sent by the NPU over the network independently of any operating system.

15. The integrated network processing unit of claim 14 wherein the sequence processor is further configured to determine that the acknowledgement is received within a predetermined period of time, whereupon the one or more data frames are transmitted by the sequence processor.

16. The integrated network processing unit of claim 15 wherein security and encapsulation are negotiated before the operating system is booted.

* * * * *